(12) United States Patent
Kitamura et al.

(10) Patent No.: US 7,220,958 B2
(45) Date of Patent: May 22, 2007

(54) OPTICAL DISPLACEMENT SENSOR AND EXTERNAL FORCE DETECTING DEVICE

(75) Inventors: Atsushi Kitamura, Shizuoka-ken (JP); Shigeyuki Adachi, Shizuoka-ken (JP); Sawa Tanabe, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 170 days.

(21) Appl. No.: 11/127,709

(22) Filed: May 12, 2005

(65) Prior Publication Data

US 2005/0257627 A1 Nov. 24, 2005

(30) Foreign Application Priority Data

May 18, 2004 (JP) .............................. 2004-147713

(51) Int. Cl.
*G06M 7/00* (2006.01)
*G09G 5/08* (2006.01)
*G01D 5/34* (2006.01)

(52) U.S. Cl. .................. 250/221; 250/231.13; 345/161

(58) Field of Classification Search ........... 250/231.13, 250/221; 345/161
See application file for complete search history.

(56) References Cited

U.S. PATENT DOCUMENTS 5,117,305 A * 5/1992 Dey .......................... 359/529

| 6,800,843 | B2 * | 10/2004 | Horton ................... 250/231.13 |
| 6,834,558 | B2 * | 12/2004 | Anderson ............... 73/862.323 |
| 6,907,794 | B2 * | 6/2005 | Arai ....................... 73/862.324 |
| 7,057,154 | B2 * | 6/2006 | Kitamura et al. ........... 250/221 |
| 7,105,802 | B2 * | 9/2006 | Kitamura et al. ...... 250/231.13 |
| 2005/0252310 | A1 * | 11/2005 | Kitamura et al. ....... 73/862.324 |
| 2006/0043273 | A1 * | 3/2006 | Kitamura et al. ...... 250/231.13 |

FOREIGN PATENT DOCUMENTS

JP 03-245028 10/1991

* cited by examiner

*Primary Examiner*—John R. Lee
(74) *Attorney, Agent, or Firm*—McDermott Will & Emery LLP

(57) ABSTRACT

An external force detecting device comprises a hollow-cylindrical support section, an action section disposed centrally inside the support section, and an optical displacement sensor which includes, at the action section on its center axis: a light source to emit a light beam in a direction along the center axis of the action section; a light branching member to branch the light beam into three light beams to progress respectively in three directions oriented at an equi-angular distance; and a light reflecting member to reflect the three light beams in a direction parallel to a plane perpendicular to the center axis, and which also includes, at the support section, three light receiving elements arranged in a rotation-symmetric manner at a 120 degree interval with their light receiving faces looking toward the center axis of the action section so as to receive respectively the three light beams reflected.

5 Claims, 5 Drawing Sheets

OPTICAL DISPLACEMENT SENSOR AND EXTERNAL FORCE DETECTING DEVICE

This application claims priority from Japanese Application No. 2004-147713, filed May 18, 2004 (incorporated by reference herein).

BACKGROUND OF THE INVENTION

1. Field of the Invention

The present invention relates to an optical displacement sensor and an external force detecting device, and more particularly to an optical displacement sensor adapted to sense and detect a relative positional displacement between a reference object, namely a support section and a measurement object, namely an action section based on displacement of a light reception position, and further to an external force detecting device adapted to detect an external force applied to the measurement object, namely the action section based on an output signal from the optical displacement sensor.

2. Description of the Related Art

An external force detecting device, such as a six-axis optical force sensor, is conventionally known, in which a displacement amount of an action section (measurement object) to receive an external force relative to a support section (reference object) to support the action section is detected by an optical displacement sensor, and the external force received at the action section is measured according to an output signal from the optical displacement sensor.

For example, a six-axis optical force sensor comprises optical displacement sensors to measure a six-axis direction displacement, based on which a six-axis force is calculated. Specifically, such a six-axis optical force sensor comprises three optical displacement sensors, each of which uses an optical sensor unit and is capable of measuring a two-axis (x and y) direction displacement, and which in combination enable measurement of a six-axis direction displacement. The optical displacement sensor comprises a light emitting diode (LED) as a light source and a photodiode (PD) assembly as a light receiving element, such that the LED opposes the PD assembly with their respective optical center axes aligned to each other. The PD assembly is composed of four PD's and receives light emitted from the LED at its center area equally shared by the four PD's, whereby displacement of light reception position at the PD assembly, that is to say, relative positional displacement between a component attached to the LED and a component attached to the PD assembly can be detected in the optical displacement sensor. In the six-axis optical force sensor, a six-axis force applied between the component attached to the LED and the component attached to the PD assembly is measured according to an output signal from each of the optical displacement sensors.

FIG. 1 is a plan view of a main body of a conventional six-axis optical force sensor 101 as disclosed in, for example, Japanese Patent Application Laid-Open No. H03-245028. The six-axis force sensor 101 is basically composed of the aforementioned main body shaped cylindrical, and top and bottom lids (not shown in the figure). Referring to FIG. 1, the main body is constituted basically by a frame 105, which integrally includes: a support section 102 shaped cylindrical; an action section 103 located centrally inside the support section 102, and adapted to receive an external force applied; and three elastic spoke sections 104 crookedly structured so as to elastically connect the action section 103 to the support section 102 and to be elastically deformed for generating an appropriate displacement amount corresponding to a force to be measured. The frame 105 is made of a single piece of an aluminum alloy material and shaped by cutting and electric discharge machining. The support section 102 and the action section 103 are fixedly attached respectively to two components to which a measurement force is applied, and when a force applied acts on the six-axis force sensor 101 structured as described above, a micro-displacement with respect to three-axis direction and a micro-rotation with respect to three-axis rotational direction are generated between the support section 102 and the action section 103.

The six-axis force sensor 101 further includes three light sources 106 disposed at the inner circumference of the support section 102 at a 120 degree interval (i.e. at an equi-angular distance), and three optical sensors (light receiving elements) 108 disposed at the action section 103 at a 120 degree interval (i.e. at an equi-angular distance) so as to oppose respective three light sources 106 with mutual optical axes aligned to each other. Each optical sensor 108 and each light source 106 disposed opposite to the optical sensor 108 make up an optical displacement sensor 109.

FIG. 2 is an explanatory perspective view of the optical displacement sensor 109 shown in FIG. 1. As shown in FIG. 2, each of the optical sensors 108 is constituted by a PD assembly composed of four PD's 108a. The light sources 106 disposed so as to oppose respective optical sensors 108 are each constituted by an infrared high-intensity LED with a pinhole aperture provided at its front face, and light emitted from the LED 106 and passing through the pinhole aperture propagates diffusedly and impinges on the center portion of the optical sensor 108 so as to be substantially equally irradiated on all the four PD's 108a. If the support section 102 and the action section 103 are displaced relative to each other by an external force, then the light emitted from the LED 106 is irradiated unequally on the four PD's 108a, and light amounts received at respective four PD's 108a are measured for calculation of relative displacements with respect to x- and y-axis directions. And, the six-axis force sensor 101 calculates forces with respect to six-axis directions according to the relative displacements calculated as above, and a signal is outputted therefrom.

As described above with reference to FIGS. 1 and 2, the conventional six-axis optical force sensor 101 comprises: the frame 105 which includes elastic spoke sections 104 structured so as to be elastically deformed by an applied force to be measured; and three of the optical displacement sensors 109 each of which consists of the light source 106, and the optical sensor 108 adapted to detect the displacement according to the deformation.

The above-described six-axis force sensor (external force detecting device) is used mainly in industrial robots so as to detect external forces in controlling the wrist portions. For enhancing the performance in the motion of the robots, the six-axis force sensor is preferably incorporated also in the finger portions, which requires the six-axis force sensor to be downsized.

However, since, as described above, in the conventional six-axis force sensor each of the three optical displacement sensors must be provided with a light source and also a light receiving element, the sizes of the light source and the light receiving element constitute a constraint in reducing the radial directional dimension of an external force detecting device, and also costly semi-conductor devices required make it difficult to reduce the cost of a six-axis force sensor.

SUMMARY OF THE INVENTION

The present invention has been made in light of the circumstances described above, and it is an object of the present invention to provide a six-axis force sensor which enables reduction of the radial directional dimension of an external force detecting device, and which can be produced less expensively.

In order to achieve the object described above, according to one aspect of the present invention, there is provided an external force detecting device comprising: a support section shaped into a hollow cylinder; an action section disposed centrally inside the support section; and an optical displacement sensor. The optical displacement sensor includes: a light source which is disposed at the action section on the center axis of the action section, and which emits a light beam in a direction along the center axis; a light branching member which is disposed at the action section on the center axis, and which branches the light beam emitted from the light source into three light beams to progress in respective directions oriented rotation-symmetrically about the center axis at a 120 degree interval; a light reflecting member which is disposed at the action section on the central axis, and which reflects the three light beams in a direction parallel to a plane perpendicular to the center axis; and three light receiving elements which are disposed at the support section in a rotation-symmetric manner at a 120 degree interval such that their light receiving faces look toward the center axis of the action section so as to receive respectively the three light beams reflected at the light reflecting member. The optical displacement sensor thus structured detects displacement of the action section relative to the support section based on the position of each of the three light beams received at the light receiving faces of the light receiving elements, and sends out a signal, based on which an external force applied relatively to the support section and the action section is calculated.

Thus, the external force detecting device according to the present invention incorporates an optical displacement sensor which uses only one light source together with three light receiving elements, and therefore can be downsized compared to a conventional external force detecting device incorporating an optical displacement sensor which uses three light sources together with three light receiving elements. Also, since only one light source is used, only one set of costly semi-conductor device and driving circuit is required thus achieving cost reduction.

In the one aspect of the present invention, the light branching member may be constituted by a bidirectional diffraction grating.

In the one aspect of the present invention, the light reflecting member may be constituted by a three reflection-surface mirror.

In the one aspect of the present invention, the light reflecting member may be constituted by a conical mirror.

According to a second aspect of the present invention, there is provide an optical displacement sensor comprising: a light emitting unit disposed at one of a reference object and a measurement object, and a light receiving unit disposed at the other one of the reference object and the measurement object, that is not provided with the light emitting unit. The light emitting unit includes: a light source which is disposed on a predetermined axis, and which emits a light beam in a direction along the predetermined axis; a light branching member which is disposed on the predetermined axis, and which branches the light beam emitted from the light source into three light beams to progress in respective directions oriented rotation-symmetrically about the predetermined axis at a 120 degree interval; and a light reflecting member which is disposed on the predetermined axis, and which reflects the three light beams in a direction parallel to a plane perpendicular to the predetermined axis, and the light receiving unit includes three light receiving elements which are disposed at a circumference of a circle having the predetermined axis as its center in a rotation-symmetric manner at a 120 degree interval such that their light receiving faces look toward the predetermined axis so as to receive respectively the three light beams reflected at the light reflecting member. The optical displacement sensor thus structured detects displacement of the measurement object relative to the reference object based on the position of each of the three light beams received at the light receiving faces.

Thus, the optical displacement sensor according to the present invention uses only one light source together with three light receiving elements, and therefore can be downsized compared to a conventional optical displacement sensor which uses three light sources together with three light receiving elements. Also, since only one light source is used, only one set of costly semi-conductor device and driving circuit is required thus achieving cost reduction.

DETAILED DESCRIPTION OF THE PREFERRED EMBODIMENT

Figure 1:
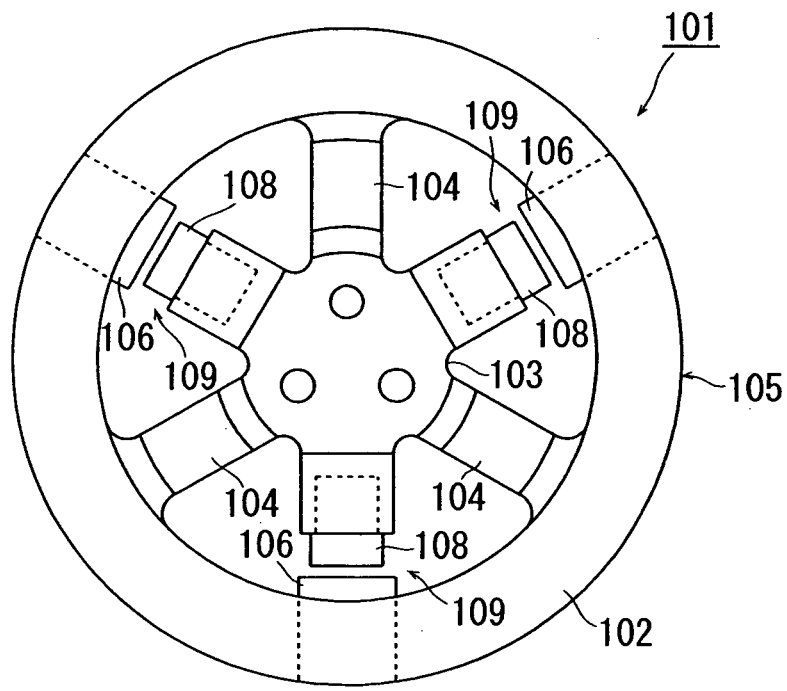
FIG. 1 is a top plan view of a conventional six-axis force sensor without its top lid.
Figure 2:
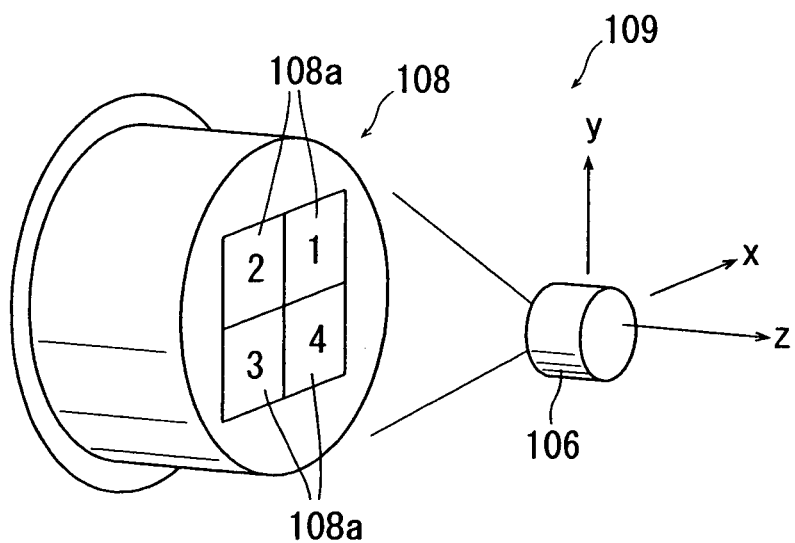
FIG. 2 is an explanatory perspective view of an optical sensor unit (optical displacement sensor) of the conventional six-axis force sensor of FIG. 1.

A preferred embodiment of the present invention will hereinafter be described with reference to the accompanying drawings. In the embodiment described below, an optical displacement sensor according to the present invention is applied to such a six-axis optical force sensor, for example, as shown in FIG. 1, but the present invention is not limited to application to an external force detecting device to detect six-axis force.

Figure 3:
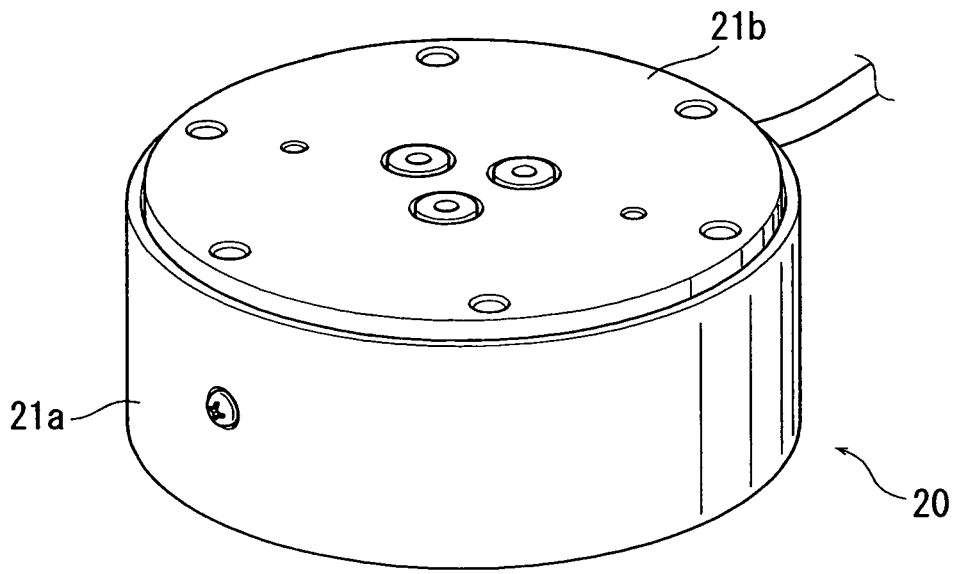
FIG. 3 is a perspective view of a six-axis force sensor according to the present invention.

Referring to FIG. 3, a six-axis force sensor 20 according to the present invention comprises a main body 21*a* shaped cylindrical, and a top lid 21b shaped like a disk and disposed at the top of the main body 21a.

Figure 4:
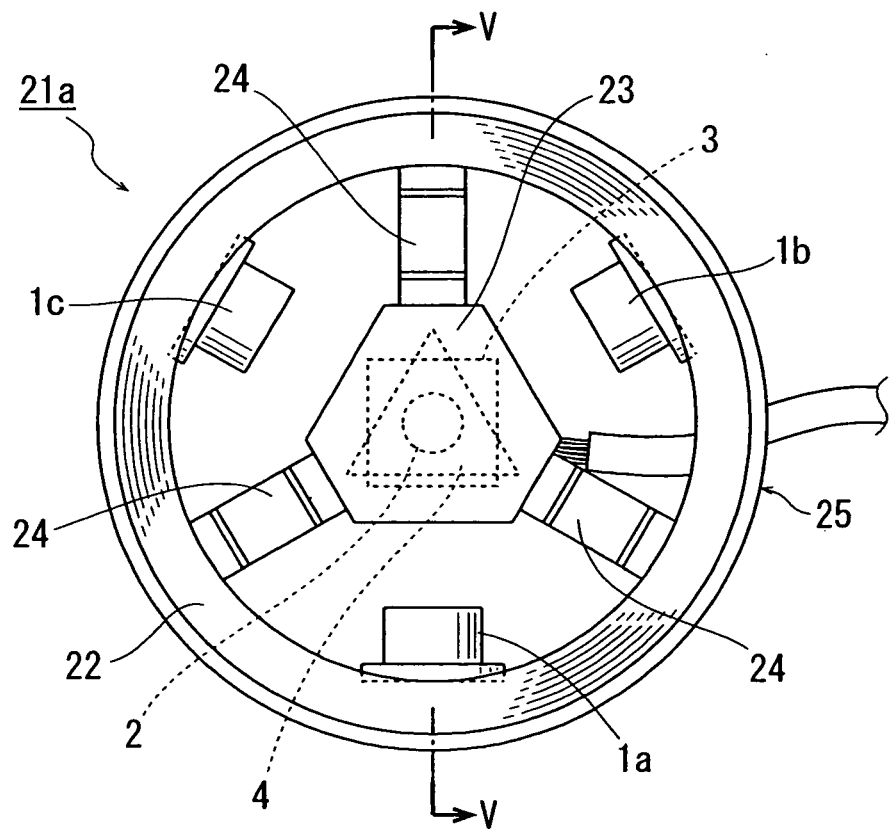
FIG. 4 is a top plan view of a main body of the six-axis force sensor of FIG. 3.
Figure 5:
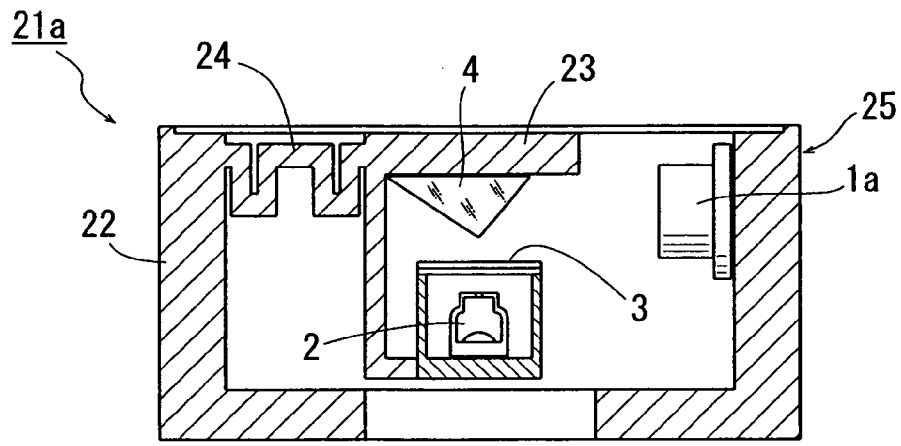
FIG. 5 is a side sectional view of the main body of FIG. 4, taken along line III—III.

Referring then to FIGS. 3 and 4, the main body 21a of the six-axis force sensor 20 is constituted by a frame 25, which includes a support section 22 shaped into a hollow cylinder (circular cylinder in the figures, but may alternatively be a polygonal cylinder), an action section 23 disposed centrally inside the support section 22, and three spoke sections 24 adapted to elastically connect the support section 22 and the action section 23. The frame 25 is made of a single piece of an aluminum alloy material and shaped by cutting and electric discharge machining, and the spoke sections 24 are crookedly structured so as to readily provide elastic deformation in all directions.

The support section 22 and the action section 23 are fixed respectively to two components to which a measurement force is applied, and when the applied force acts on the six-axis force sensor 20 structured as described above, micro-displacements with respect to three-axis directions and micro-rotations with respect to rotational directions thereabout are generated between the support section 22 and the action section 23.

As shown in FIGS. 3 and 4, three light receiving elements 1a, 1b and 1c are disposed at the support section 22 at a 120 degree interval (i.e. at an equi-angular distance) with their respective light receiving faces looking toward the center axis of the action section 23, while a light source 2 to emit light in the direction along the center axis of the action section 23, a diffraction grating 3 as a light branching member, and a triangular pyramidal mirror 4 as a light reflecting member are disposed at the action section 23 on its center axis. Here, the light reflecting member may be constituted by a conical mirror, rather than the triangular pyramidal mirror 4 shown in the figures.

In the structure described above, a light beam emitted from the light source 2, while passing through the diffraction grating 3, is branched into a plurality (three or more) of light beams which are then reflected at the triangular pyramidal mirror 4 so as to impinge on the light receiving faces of respective light receiving elements 1a, 1b and 1c. Thus, the light source 2, the diffraction grating 3, the triangular pyramidal mirror 4, and the light receiving elements 1a, 1b and 1c make up an optical sensor unit, namely, an optical displacement sensor.

Figure 6:
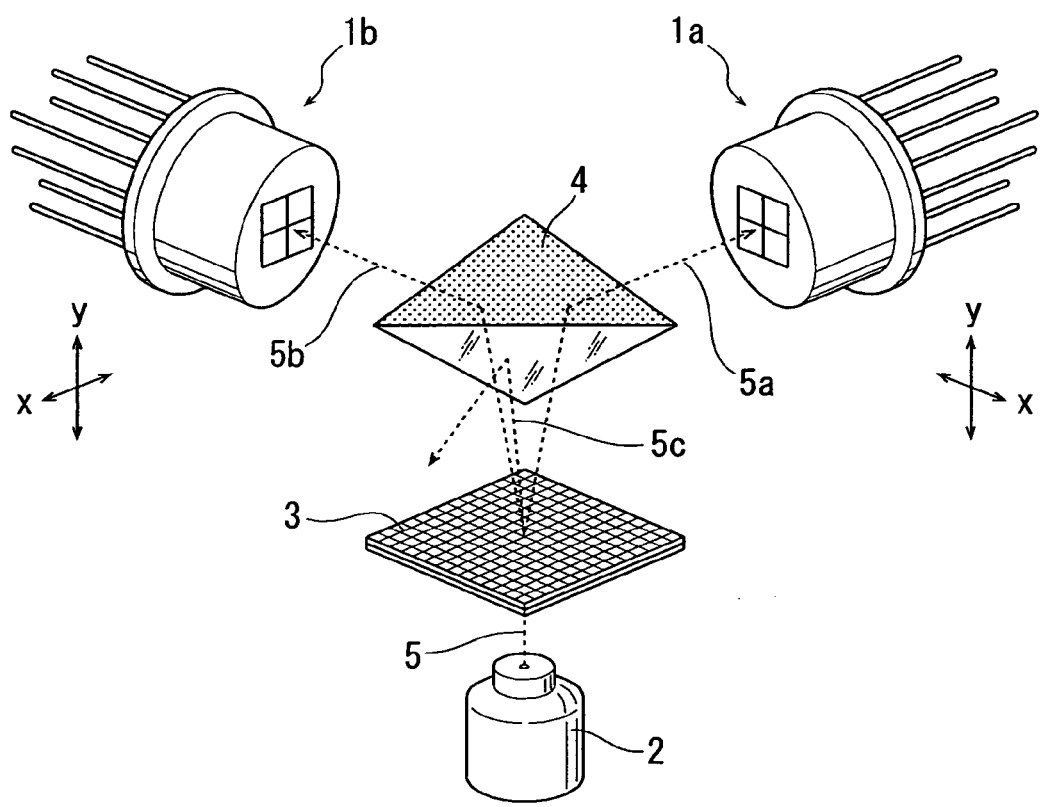
FIG. 6 is an explanatory perspective view of an example of a structure of an optical sensor unit (optical displacement sensor) shown in FIGS. 4 and 5.

Referring to FIG. 6 where the light receiving element 1c is omitted for the purpose of viewing convenience, a light beam 5 emitted from the light source (for example, a light emitting diode (LED)) 2 impinges on the diffraction grating 3, and is thereby branched into three light beams 5a, 5b and 5c. In this connection, the light beam 5 may be branched into more than three light beams. The three light beams 5a, 5b and 5c impinge on respective reflection surfaces of the triangular pyramidal mirror 4, are reflected thereat in a direction parallel to a plane perpendicular to the optical axis of the light beam 5, and impinge on the light receiving faces of the respective light receiving elements (for example, photodiode assemblies) 1a, 1b and 1c.

The light receiving faces of the light receiving elements 1a, 1b and 1c are each divided into four sections as shown in FIG. 6, details of which will hereinafter be explained with reference to FIG. 7.

Figure 7:
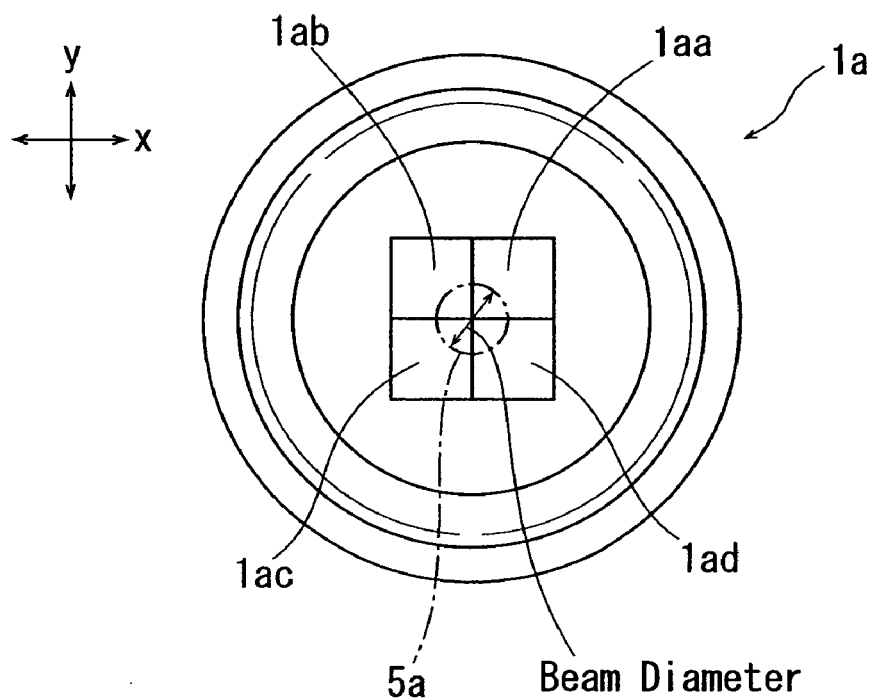
FIG. 7 is an explanatory top plan view of a light receiving face of one of light receiving elements shown in FIGS. 4 to 6.

Referring to FIG. 7 where only the light receiving element 1a is shown and explained on behalf of the three light receiving elements 1a, 1b and 1c which are structured identically with one another, the light receiving face of the light receiving element 1a includes four photodiodes (PD's) 1aa, 1ab, 1ac and 1ad, which are configured identically with one another, and which constitute a PD assembly with a crisscross-shaped boundary formed therebetween. The light beam 5a reflected at one of the reflection surfaces of the triangular pyramidal mirror 4 impinges on the light receiving face thus structured.

The crisscross-shaped boundary formed between the four PD's 1aa, 1ab, 1ac and 1ad is preferably oriented to the x- and y-axis directions, with respect to which displacement is to be sensed by the optical sensor unit (optical displacement sensor). The light beam 5a impinges on the light receiving face preferably such that its optical axis makes a right angle with the face plane and that its center coincides with the cross point of the crisscross-shaped boundary.

In the structure described above, based on changes in light receiving amounts at respective PD's 1aa, 1ab, 1ac and 1ad, the light receiving element 1a is adapted to detect shift of the position of the light beam 5a falling on the light receiving face of the light receiving element 1a, that is to say, a relative displacement with respect to the x- and y-axis directions between the light emitting portion including the light source 2, the diffraction grating 3 and the triangular pyramidal mirror 4, and the light receiving portion constituted by the light receiving element 1a. The other light receiving elements 1b and 1c are structured and function identically with the light receiving element 1a, thus respective relative displacements with respect to the x- and y-directions are duly detected.

Figure 8:
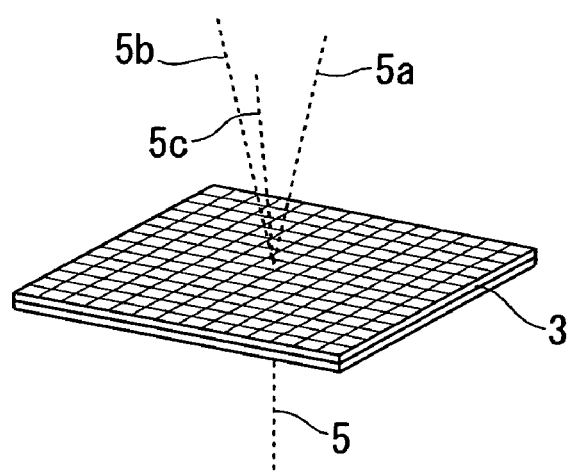
FIG. 8 is an explanatory perspective view of a diffraction grating shown in FIG. 6.
Figure 9:
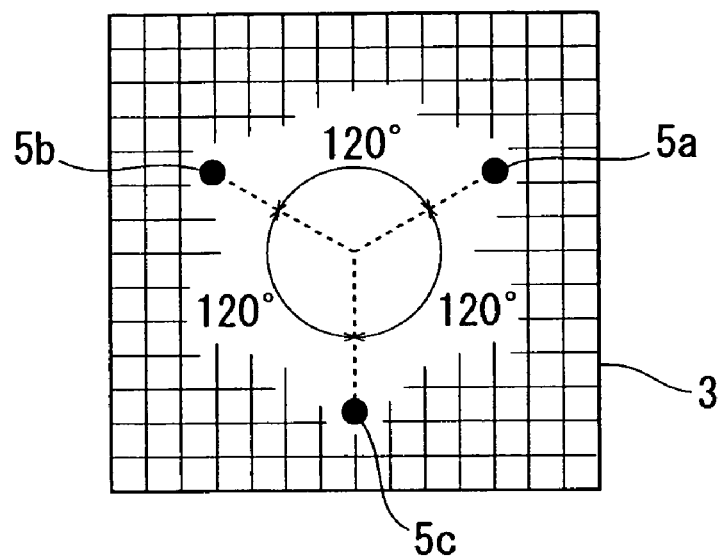
FIG. 9 is an explanatory top plan view of the diffraction grating of FIG. 8.

The diffraction grating 3 will hereinafter be discussed with reference to FIGS. 8 to 10. Referring to FIG. 8 and FIG. 6 as well, the light beam 5 emitted from the light source 2 impinges on the diffraction grating 3 which then branches the light beam 5, preferably equally, into three light beams 5a, 5b and 5. Referring to FIG. 9, the diffraction grating 3 is structured such that the three light beams 5a, 5b and 5c branched are adapted to progress in respective directions which are rotation-symmetrically oriented at a 120 degree interval about the optical axis of the light beam 5.

Figure 10:
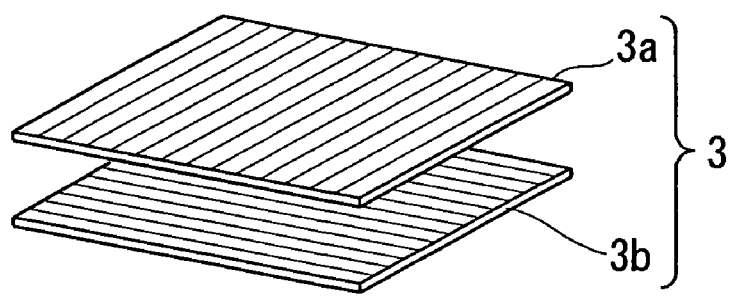
FIG. 10 is an exploded perspective view of an example of a structure of the diffraction grating of FIG. 8.

Referring to FIG. 10, in the present embodiment, the diffraction grating 3 is structured such that a diffraction grating piece 3a having a predetermined grating direction is superimposed on a diffraction grating piece 3b having a grating direction different from the grating direction of the diffraction grating piece 3a, wherein the light beam 5 is duly branched into the three light beams 5a, 5b and 5c as described above by appropriately arranging the grating pitch (distance between adjacent two grooves or ridges) of the diffraction grating pieces 3a and 3b, the angle made by respective grating directions of the diffraction grating pieces 3a and 3b, and the depth/height and configurations on the grooves/ridges of the diffraction grating pieces 3a and 3b.

The diffraction grating 3 in FIG. 10 is composed of two pieces as described above, but may alternatively be composed of one piece that defines two grating directions achieved by a plurality of grooves or ridges put in an appropriate arrangement, in which case the two grating directions may be achieved totally on one surface of the one-piece diffraction grating, or dividedly on both surfaces thereof.

The optical displacement sensor according to the present invention can be applied to a six-axis force sensor as explained above, and can be applied further to measurement of various physical quantities that can be detected based on displacement.

Obviously, many modifications and variations of the present invention are possible in light of the above teachings. Thus, it is to be understood that, within the scope of the appended claims, the invention may be practiced otherwise than as specifically described above.

What is claimed is:

1. An external force detecting device comprising:
   a support section shaped into a hollow cylinder;
   an action section disposed centrally inside the support section; and
   an optical displacement sensor including:
   a light source which is disposed at the action section on a center axis of the action section, and which emits a light beam in a direction along the center axis;
   a light branching member which is disposed at the action section on the center axis, and which branches the light beam emitted from the light source into three light beams to progress in respective directions oriented rotation-symmetrically about the center axis at a 120 degree interval;
   a light reflecting member which is disposed at the action section on the central axis, and which reflects the three light beams in a direction parallel to a plane perpendicular to the center axis; and
   three light receiving elements which are disposed at the support section in a rotation-symmetric manner at a 120 degree interval such that their light receiving faces look toward the center axis of the action section so as to receive respectively the three light beams reflected at the light reflecting member,
   the optical displacement sensor detecting displacement of the action section relative to the support section based on a position of each of the three light beams received at the light receiving faces of the light receiving elements, and sending out a signal, based on which an external force applied relatively to the support section and the action section is calculated.

2. An external force detecting device according to claim 1, wherein the light branching member is constituted by a bidirectional diffraction grating.

3. An external force detecting device according to claim 1, wherein the light reflecting member is constituted by a three reflection-surface mirror.

4. An external force detecting device according to claim 1, wherein the light reflecting member is constituted by a conical mirror.

5. An optical displacement sensor comprising:
   a light emitting unit disposed at one of a reference object and a measurement object, and including: a light source which is disposed on a predetermined axis, and which emits a light beam in a direction along the predetermined axis; a light branching member which is disposed on the predetermined axis, and which branches the light beam emitted from the light source into three light beams to progress in respective directions oriented rotation-symmetrically about the predetermined axis at a 120 degree interval; and a light reflecting member which is disposed on the predetermined axis, and which reflects the three light beams in a direction parallel to a plane perpendicular to the predetermined axis; and
   a light receiving unit disposed at the other one of the reference object and the measurement object, that is not provided with the light emitting unit, and including three light receiving elements which are disposed at a circumference of a circle having the predetermined axis as its center in a rotation-symmetric manner at a 120 degree interval such that their light receiving faces look toward the predetermined axis so as to receive respectively the three light beams reflected at the light reflecting member, the optical displacement sensor detecting displacement of the measurement object relative to the reference object based on a position of each of the three light beams received at the light receiving faces.

* * * * *